United States Patent Office

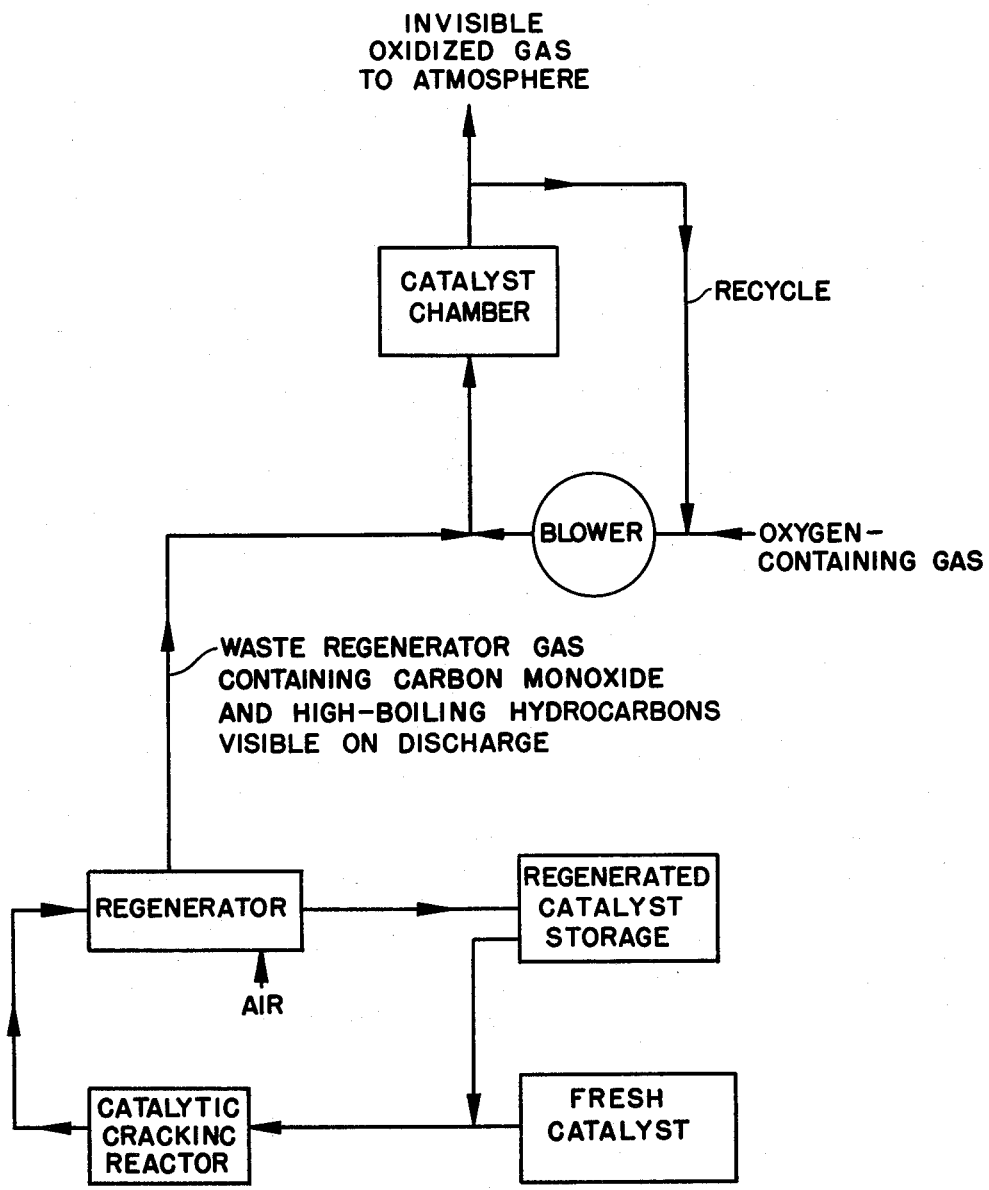

2,756,121
Patented July 24, 1956

2,756,121

OXIDATION OF WASTE GASES

William W. Grimes, Cleveland, Ohio, assignor to The Standard Oil Company, Cleveland, Ohio, a corporation of Ohio Application February 8, 1954, Serial No. 408,666

6 Claims. (Cl. 23—1)

The present invention relates to an improved method for the oxidation of waste gases which contain high-boiling hydrocarbons and carbon monoxide.

In the catalytic cracking of petroleum, a hydrocarbon stock is contacted with a cracking catalyst. After continued use of the catalyst in the cracking operation, a layer of "coke" normally accumulates on the surface of the catalyst which necessitates regeneration of the catalyst. The regeneration is usually accomplished by burning off the layer of coke by blowing air or an oxygen-containing gas over the catalyst. In carrying out this operation, the coke-bearing catalyst is transported by gravity from the catalytic reactor to a kiln where the coke is burned from the catalyst. However, the kiln is operated at a lower positive pressure than the reactor and consequently high-boiling hydrocarbons which are absorbed on the surface of the coke-bearing catalyst in the reactor are flashed off when the catalyst enters the lower pressure and higher temperature zone in the kiln. A portion of these high-boiling liquid hydrocarbons escape unburned from the kiln along with the waste regenerator gases. The gas liberated from the regenerator, therefore, normally contains a quantity of hydrocarbons boiling in the range of about 500–700° F. as well as substantial quantities of nitrogen, carbon dioxide and carbon monoxide.

In the past, it has been common practice to dispose of the waste regeneration gas by venting it to the atmosphere. However, in so doing, the liberated gas from the regenerator forms an unsightly "plume" in the atmosphere which results from the condensation of the high-boiling hydrocarbons contained therein to form an aerosol. With the increasing interest of municipal authorities in the control of atmospheric pollution, it has become important that the hydrocarbons which are responsible for the formation of the aforesaid unsightly plume be removed from the gas prior to its release into the atmosphere.

It has previously been proposed in the art that various types of waste gases which contain carbon monoxide and other combustible gases can be oxidized in the presence of an oxygen-containing gas by means of a catalyst for the twofold purpose of recovering heat by the complete combustion of carbon monoxide and converting objectionable components in the waste gas to components which are not objectionable.

One of the catalysts which has been proposed for the oxidation of waste gases containing carbon monoxide is platinum and numerous types of platinum catalysts have been disclosed in the art. Generally, these platinum catalysts are prepared by impregnating a finely-divided, high-surface area support with metallic platinum. For example, in the U. S. Patent No. 1,919,626 porous blocks of pumice are impregnated with platinic chloride which is then reduced to metallic platinum by heat. Other platinum catalyst can be prepared by generally similar procedures.

In accordance with the suggestions of the pior art, I have tried to dispose of the waste regeneration gas from a cracking catalyst regenerator by admixing the waste gas with air and passing the mixture over a platinum catalyst. This was found to work quite efficiently and enough heat was developed by the oxidation of the carbon monoxide in the waste regenerator gas to oxidize substantially all of the hydrocarbons contained in the gas. However, this process possessed one serious disadvantage in that there was found to occur a gradual decline in the activity of the platinum combustion catalyst and in a relatively short time a point was reached in which the platinum catalyst had negligible activity. Further investigation revealed that the decline in activity was caused by the formation of a layer of coke on the surface of the platinum catalyst. The formation of coke on the platinum catalyst will not occur when burning a waste gas containing minute quantities of low boiling hydrocarbons. However, as explained heretofore, the particular waste gas that I am trying to oxidize contains quantities of high-boiling hydrocarbons, which apparently polymerize to form a layer of coke on the catalyst and thereby shorten the useful life of the catalyst.

In view of this disadvantage of the prior art process, it is the primary object of the present invention to provide a method for the oxidation of a waste gas containing carbon monoxide and high-boiling hydrocarbons by a platinum catalyst in the presence of an oxygen-containing gas in which process the useful life of the catalyst is considerably longer than in the prior art processes.

In accordance with the invention, I have found that the useful life of the platinum catalyst can be appreciably lengthened by recycling a portion of the hot oxidized gas to the incoming oxygen-containing gas or to the waste regenerator gas in an amount to raise the temperature of the mixture of gases entering the catalyst chamber to at least about 700° F.

The invention can be more fully illustrated by reference to the accompanying drawing which is a flow sheet of the process. As seen from the drawing, waste regenerator gas (from the regenerator of a catalytic cracking unit) which contains carbon monoxide and high-boiling hydrocarbons is fed to a catalyst chamber which contains a platinum catalyst. Coincident with the introduction of the waste regenerator gas to the catalyst chamber, an oxygen-containing gas is also supplied to the chamber by means of a blower. When the mixture of waste gas and oxygen-containing gas contacts the platinum catalyst, the mixture is oxidized exothermically and the heat liberated thereby causes oxidation of the hydrocarbons to the primary oxidation product carbon dioxide, and the oxidized gases are vented to the atmosphere or to suitable heat-recovery means. As soon as a constant flow of hot, oxidized gases is established at the exit of the catalyst chamber, a portion of the hot oxidized gas is recycled to the inlet of the blower thereby raising the temperature of the oxygen-containing gas before its admixture with the waste gas. The degree of temperature rise is not a critical factor because any increase, however small, in the temperature of the oxygen-containing gas is of benefit in promoting longer catalyst life. However, in order to obtain an appreciable increase in the life of the catalyst, the temperature of the oxygen-containing gas should be raised sufficiently to in turn raise the temperature of the inlet gases to the catalyst chamber to at least about 700° F. Correspondingly, there is no well-defined upper limit on the temperature to which the oxygen-containing gas can be preheated.

In a typical illustrative example of the process, waste gas from a regenerator of a catalytic cracker unit at the rate of 250 SCFM was supplied to the catalyst chamber together with atmospheric air. The waste regenerator gas contained about 5% of carbon monoxide and minute quantities of hydrocarbons boiling above 500° F. The catalyst was a commercial catalyst in brick form prepared by impregnating a high surface area support with metallic platinum. When the temperature within the catalyst chamber has risen to about 1400° F., a portion of the oxidized gas was recycled to the inlet of the air blower in sufficient quantity to raise the temperature of the mixture of gases entering the catalyst chamber to about 700° F. The bulk of the oxidized gas was vented to the atmosphere without formation of a plume. The operation was continued, for an appreciable length of time without experiencing a noticeable decline in the activity of the catalyst.

It can be seen from the preceding illustration that the recirculation of a portion of the oxidized gas appreciably prolongs the useful life of the catalyst.

The improved method of the invention is applicable to any process in which a gas containing a combustible quantity of carbon monoxide and a minute quantity of high-boiling hydrocarbons is admixed with an oxygen-containing gas and contacted with a platinum catalyst. It is especially useful for the oxidation of waste regeneration gases from a catalytic cracker.

The platinum catalyst used in the process may be any of those proposed in the art for the oxidation of carbon monoxide. In addition to catalyst in which the active component is metallic platinum, it is believed that the process is applicable to other equivalent oxidation catalysts.

It is intended to cover all changes and modifications in the examples of the invention, herein given for purposes of disclosure, which do not constitute departure from the spirit and scope of the appended claims.

I claim:

1. A process for the oxidation of a waste gas having a temperature substantially less than 700° F. and containing carbon monoxide and high-boiling hydrocarbons in an amount sufficient to form an optically dense aerosol upon the discharge of the gas to the atmosphere, which comprises admixing said gas with an oxygen-containing gas and an appreciable portion of a hot oxidized recycle gas in an amount sufficient to raise the temperature of the resultant mixture of gases to at least about 700° F., passing said mixture of gases into contact with a platinum catalyst at a temperature of at least about 700° F. to burn said carbon monoxide and sufficient of said hydrocarbons so that the resulting gas is raised to a temperature substantially above 700° F. and is not optically visible upon discharge to the atmosphere, and recycling an appreciable portion of said gas prior to discharge to constitute the heretofore mentioned hot oxidized recycle gas.

2. The process of claim 1, in which the non-recycled gas is discharged to the atmosphere.

3. The process of claim 2, in which the non-recycled gas is passed through a heat recovery means before discharge to the atmosphere.

4. The process of claim 1, in which the hot recycle gas is mixed with the oxygen-containing gas before mixing with the waste gas.

5. The process of claim 1, in which the hot oxidized recycle gas is mixed with the waste gas before mixing with the oxygen-containing gas.

6. The process of claim 1, in which the hot oxidized recycle gas, the oxygen-containing gas, and the waste gas are mixed simultaneously.

References Cited in the file of this patent

UNITED STATES PATENTS

| | | |
|---|---|---|
| 1,877,523 | Gordon | Sept. 13, 1932 |
| 2,248,994 | Houdry | July 15, 1941 |

FOREIGN PATENTS

| | | |
|---|---|---|
| 411,655 | Great Britain | June 14, 1934 |